United States Patent Office 3,413,323
Patented Nov. 26, 1968

3,413,323
PROCESS FOR THE PREPARATION OF CARBOXYLIC ACIDS FROM HYDROCARBONS
Currie B. Berry, Baton Rouge, La., assignor to Ethyl Corporation, New York, N.Y., a corporation of Virginia
No Drawing. Filed July 6, 1965, Ser. No. 469,899
4 Claims. (Cl. 260—413)

ABSTRACT OF THE DISCLOSURE

The invention disclosed is a step-wise process for producing saturated aliphatic acid soaps from normal hydrocarbon oxidate by saponification to convert acid groups to soaps, separating the soaps from the unsaponifiables, mildly hydrogenating the soaps to saturate the olefinic groups and convert carbonyls to hydroxyl groups, then dehydrating the hydroxyl groups to produce olefinic soaps which are mildly hydrogenated to obtain saturated soaps free of hydroxyl groups, carbonyl groups, esters and lactones.

---

This invention relates to the preparation of carboxylic acids and in particular to the preparation of such acids by processes involving an oxidation of hydrocarbons and in which non-acid oxygenated groups are readily removed from acidic and non-acidic hydrocarbon molecules.

The production of carboxylic acids by the oxidation of hydrocarbons is a process that has been performed with generally mediocre success for many years. The patent literature is replete with examples of the oxidation of various materials such as scale wax and hard paraffins and with processes involved in the purification of oxygenated materials resulting from such oxidations. The purification patents speak frequently of hydrogenation of acids to oxidate to reduce over-oxygenation and also to convert acidic oxidate to alcohols when alcohols constitute the desired product rather than acids. In general the person reading such patent literature is impressed not only by the volume but by the contradictory nature of the patents in that very much the same conditions are described for purifying acids as are described for destroying acids in converting them to alcohols. This is a very unfortunate situation because experimentation necessary to eliminate the blind alleys becomes very extensive and expensive and buried in the mass of contradiction one can find patents that singly or in combination could be interpreted in a paper experiment as teaching that everything imaginable is old. Nonetheless I have approached the problem from a belief that effective conversion of oxidate to high yields of pure acids is possible but that it cannot be done effectively in single stage process such as in U.S. Patents 2,059,201 and 2,059,232 because of conflicting equilibria. I believe that it is for this reason more than for any other that prior art processes could not produce straight chain acids of high quality.

Since the present process provides outstanding results in comparison to those possible with even the best prior art processes, which were never really satisfactory, it is extremely important to realize that here is involved a new generation of hydrocarbon oxidation technology in which the essential result is an economic commercial process for the large scale production of straight chain monofunctional carboxylic acids of high purity.

It is accordingly an object of the present invention to provide a process for the oxidation of hydrocarbons to produce straight chain monofunctional carboxylic acids.

Another object of the present invention is to provide a process for the removal of non-acid oxygenated groups from mixtures of acidic and non-acidic hydrocarbon molecules whereby saturated straight chain monofunctional carboxylic acids are obtained in high yield and purity.

Another object of the present invention is to provide a process whereby carbonyl and hydroxyl groups contained in carboxylic acid molecules are readily removed and olefinic linkages contained in acid molecules are readily saturated.

Another object of the present invention is to provide a process whereby internal hydroxyl groups are readily removable from carboxylic acids without the accompaniment of large scale side reactions which has characterized prior processes.

Other and further objects and features of the present invention will become apparent upon careful consideration thereof in view of the following description.

In accordance with the basic teachings of the present invention, carboxylic acids are produced by the oxidation of hydrocarbons typically using oxygen from the air at pressures of from about atmospheric to several atmospheres and temperatures from about 100° to 160° C. Hydrocarbons are oxidized which preferably contain an average of from about 4 to about 10 carbon atoms per molecule in excess of the average quantity of carbon atoms desired in the product acids because this optimizes the yield of product acids per pound of hydrocarbon feed. Oxidation times vary depending upon the conditions employed and in general are controlled so as to obtain an oxidation extent from about 10 to about 70 percent, typically about 30 percent, of the hydrocarbon molecules being converted to molecules containing oxygenated groups. The results will be oxidation times varying from a few hours at the higher temperatures of about 160° C. to an oxidation period of the order of one or more days at the lower temperatures and higher conversions exemplified above. It is well known in the art that various catalysts, organic and inorganic, can be used, such as salts of cobalt and manganese containing organic radicals corresponding approximately to those of the desired acids to be produced, as well as smaller organic radicals such as isobutyl and that various other activators or catalysts, such as tertiary butyl hydroperoxide, may be employed for their beneficial effect upon the rate of oxidation.

It is well known that oxidations performed along the lines of the foregoing are not selective; that is, oxygen attacks occur at various carbon atoms of the hydrocarbon molecules. As a general proposition the attacks occur at internal carbon atoms with a higher statistical percentage than at terminal carbon atoms, particularly when the hydrocarbons themselves contain 15 or more carbon atoms per molecule. The completion of oxidation at an internal carbon atom location involves molecular cleavage, the result being that cleavage is involved with virtually every hydrocarbon molecule that oxidizes to a carboxylic acid. Since numerous stages or degrees of oxidation exist between that occasioned by an initial attack and the completed carboxylic acid state, polyfunctional molecules are produced having, in addition to one or more carboxylic acid groups, various combinations of other oxygenated groups such as carbonyl groups and hydroxyl groups. These additional groups render undesirable as pure monobasic acids the carboxylic acid molecules containing them and in addition they result in numerous forms of inter- and intra-molecular reactions and combinations such as esters, polyesters, lactones and numerous other such materials as well as various condensation and polymerization reaction products. It is readily apparent that not only do such polyfunctional molecules render product acids far less desirable where monofunctionality is required but that they detract seriously from the quantity of product range acids available.

The present invention is highly concerned with simple and effective processes for removing non-acid oxygenated groups from acidic and non-acidic hydrocarbon molecules to provide pure acids and to accomplish this without destruction of carboxyl groups or molecular cleavage and before significant adverse esterification, condensation and polymerization can occur. In the practice of this invention several conversion steps are employed and it is essential that some of them be performed in the proper sequence. As a general proposition it is necessary to perform the conversions in two or more separate reactor vessels because of the fact that some of the reactions appear to require conditions which conflict to some extent with conditions desired for other steps. Typically an early processing step applied to oxidate is saponification which converts molecules having carboxylic acid groups into metal salts, such as sodium salts where sodium hydroxide is used as the saponification agent. Following the saponification of the acidic molecules it is preferred to separate the soap molecules from the non-soap or hydrocarbon molecules which separation is readily accomplished because of the fact that the soaps are soluble in an aqueous system leaving the hydrocarbons to float thereupon as a separate phase.

The hydrocarbon phase will normally be removed and returned to the oxidizer for further oxidation however in many instances it is desirable to treat this material further prior to its return to the oxidizer as for example to convert all hydroxyl groups contained therein into carbonyl groups by dehydrogenation since carbonyl groups are more highly preferred for continued oxidation to acid than are secondary alcohol groups.

The soap phase that results after removal of the hydrocarbon is hydrogenated under mild conditions to saturate carbonyl groups converting them into secondary hydroxyl groups. This conversion can be accomplished readily under mild conditions having virtually no adverse effect upon the saponified carboxyl groups. Typical conditions for such a mild carbonyl hydrogenation are temperature from about 100° C. to about 200° C., pressure from about 100 to about 500 p.s.i. Raney nickel catalyst about 0.1 to about 10 percent, the aqueous solution of the soaps being approximately 30 percent by weight. Typical hydrogenation times are from about 1 to about 5 hours during which virtually complete conversion of carbonyls to hydroxyls is obtained. It has been found that the foregoing conditions are also fully effective for the saturation of any olefinic bonds that exist in the soap molecules and hence the product of this hydrogenator is fully saturated not only as to carbonyl but also as to olefinic linkages.

The foregoing steps of saponification and separation of unsaponifiables convert oxidate to two streams, one a soap stream which contains unsubstituted soaps as well as keto-soaps, hydroxy soaps and various keto-hydroxy combination. The other stream is hydrocarbon containing mainly paraffins, ketones and secondary alcohols which is returned to the oxidizer.

As one increases saponification severity in order to reduce the time involved or obtain more complete saponification of esters and the like, it is normal to experience some dehydration of hydroxyl groups during saponification. This appears to have a tendency toward increasing the likelihood of side reactions with carbonyl molecules involving resultant olefins and free radicals. In many instances this is of no serious consequence however where the utmost purity of product straight chain acids and highest overall conversion of paraffin to product acids is desired, it frequently is advantageous to place the carbonyl hydrogenator ahead of the saponifier or to perform concurrent carbonyl hydrogenation and saponification in the same vessel. The concurrent aspect is normally achieved without difficulty in view of the fact that the conditions of temperature and pressure are compatible and one operation does not seriously impede the other. The saturation of carbonyl linkages prior to separation of unsaponifiables for recycle to the oxidizer has a disadvantage in that is converts the ketones to secondary alcohols which in some respects are not as desirable for further oxidation to the acid however dehydrogenation as noted above can be employed. Actually the penalty this imposes is a very small price to pay for the freedom from condensations resultant to the copresence of ketones and olefins or free radicals.

Returning to the basic carbonyl hydrogenation discussion, the saturation of caronyl groups in he soaps produces hydroxy acid soaps which, although they have some independent utility and sales potential, must be further treated in instances where pure fatty acids are the only desired product. It has been discovered that such hydroxyl groups are readily removed from the molecules that contain them by dehydration at elevated temperatures. In some instances this dehydration is advantageously assisted by the employment of surface effect increasing arrangements including dehydration catalysts such as activated clay, alumina, silica, or the like. Such enhancement arrangements for dehydration generally permit increased reaction rates for a given unit size permitting operation at lower temperatures which is advantageous in instances where the higher temperatures have adverse effect, such as increasing polymerizations and cleavage. Generally dehydration at a temperature up to about 250° C. is preferably conducted with such a dehydration catalyst, while above that temperature catalyst is not used. Although dehydration will occur at relatively low temperatures such as 100° C., the dehydration rates at such low temperatures are normally so low that they are desired only in cases of materials which are easily decomposed. In general it is preferable to perform the dehydration at temperatures in excess of 200° C. however one must be careful to avoid prolonged exposures to temperatures at which cleavage of unsaturated acids occurs. In particular, polyunsaturated acid soaps are prone to cleavage at temperatures of the order of 275° C. while even monounsaturated acids are prone to cleavage at substantial rates at temperatures of the order of 310° C. With all of the non-acid oxo groups converted to the unsaturated form it is not unusal for there to exist at this point substantial quantities of polyunsaturated acid soaps. Thus one is forced to consider seriously the limitations imposed by cleavage of polyunsaturated soaps at about 275° C. and to make certain that this temperature is not exceeded for excessive periods of time, unless it is desired to utilize this cleavage to advantage.

The avoidance of excess caustic appears to reduce cleavage however normally one desires an excess of caustic during dehydration to saponify acids that are liberated during the process and which may leave the dehydrator in the vent stream possibly without complete dehydration. The provision of auxiliary saponification in the vent stream to recover such liberated acids and return them to the dehydrator makes it possible to operate the dehydrator at a near neutral condition so as to reduce the disadvantages of large excesses of caustic in the dehydrator.

There are several important considerations for effective dehydration of acids which are frequently given little thought. It appears that thermal dehydration for example occurs through the simultaneous cleavage of an oxygen-carbon bond on one carbon atom and the cleavage of a carbon-hydrogen bond on an adjacent carbon atom liberating water and resulting in the formation of an olefinic linkage between the two carbon atoms that are involved. High pressures such as those normally employed in hydrogenation appear to retard this operation. In some instances it may be desirable to maintain low partial pressures of hydrogen in the dehydration environment so as to quench free radicals but in such cases the hydrogen is preferably present in a relatively inert form as regards normal olefin saturations rather than as a highly active material. The presence in the dehydration mass of hydrogenation catalyst, such as nickel, carried over from the carbonyl hydrogenator does not unduly suppress dehydration even with small partial pressures of hydrogen present but one normally avoids the more severe hydrogenation conditions such as those employed to advantage in the carbonyl hydrogenator.

Another important factor in the accomplishment of effective dehydration is mobility of the mass subjected to the dehydration environment. The desire for mobility arises through the necessity for facilitating surface effect action and the migration of released water away from the point of attachment of its constituent hydrogen and hydroxyl groups on the soap molecules and for separating molecules containing free radicals and active condensation molecules such as ketones and acids. If mobility is sought through operation above the melting point, there is conflict with other desiderata because the usual sodium soaps melt at 300° or above. As a practical matter the use of water as a diluent is out of the question because of high vapor pressure at dehydration temperatures of the order of 250–300° C. and it appears to reduce dehydration rates. Various hydrocarbon diluents are useable. Thus one frequently finds it advantageous to use a higher paraffin hydrocarbon as a diluent selecting the paraffin as to molecular weight on a basis of a desirable compromise between vapor pressures at the temperature of 250–300° C. and melting point at the lower temperatures encountered in phase separations and the like. As a practical matter we select a hydrocarbon or mixture which melts somewhat below the boiling point of water at atmospheric pressure, such as eicosane. In many instances paraffins corresponding in number of carbon atoms per molecule to the acids being treated are desirable because they are already present reducing separation and recovery problems. It is of course understood that various mixtures of hydrocarbons such as those available commercially can be used to advantage in many instances and that the mixed base low melting point soaps of U.S. Patent 2,056,984 can frequently be used to advantage in providing a fluid mass at temperature below the acid cleavage points. Dehydration pressures are typically from about 0.1 to about 30 atmospheres.

The dehydration of soaps as described results in the formation of large quantities of unsaturated soaps which must be saturated to produce high purity fatty acids.

The conversion of unsaturated soaps to saturated soaps is readily accomplished in a mild hydrogenator operative under substantially the same conditions set forth for the carbonyl hydrogenator which preceded the dehydration step. The environment is aqueous with the soap concentration being typically from about 10 to 50 percent by weight, typically 30 percent. One is faced with the problem of converting the anhydrous soaps produced by the preceding dehydrator into aqueous solutions. To some extent a hydrocarbon diluent when employed in dehydration will assist this because of mobility, providing one reason for selection of the dehydration diluent as a material which melts below the boiling point of water at atmospheric pressure. Thus one normally cools the hydrocarbon soap solution effluent from the dehydrator to about 100° C. and then mixes it with hot water, following which the mixture is allowed to settle into layers which are separated. In general one prefers to dilute the soaps to a 5–10 percent solution in recovering them from the hydrocarbon and then concentrate the dilute solution to the typical 30 percent used in the olefinic saturation. The hydrocarbon upper layer is returned to the dehydration step as the diluent.

The treatment of the saturated soap solution thus obtained follows conventional practice of acidification with mineral acid such as sulfuric acid, followed by separation of the mineral salt produced leaving the mixture of organic acids. The organic acids thus obtained are quite pure and need be subjected only to minimum cleanup steps.

In the preceding discussion it was pointed out that acids are liberated in the dehydration step. It is believed that this occurs through the break up of residual esters not previously saponified. It is evident that the acids liberated are only one fragment of the ester molecules and that another fragment is involved. In general this other fragment is a derivative of a secondary alcohol and hence it will be either non acidic if the alcohol component of the ester involved was merely an alcohol whereas it will be acidic if the alcohol component of the ester was a hydroxyl group of a hydroxy acid. Where this ester component is an unsaturated acid it is evident that no special further consideration need be given since the treatment described in the foregoing handles this type of molecule with ease since it will already be in the form of a soap. In the fragment liberated is an olefin or the like, it is evident that it will have a significant vapor pressure at the temperatures involved and hence it will readily leave the dehydration environment in the vent stream particularly if it is of substantially lower molecular weight than the diluent hydrocarbon since high pressure operation of the dehydrator is not desired.

EXAMPLE I

A mixture of normal hydrocarbons having from 14 to 18 carbon atoms per molecule is oxidized with air at a temperature of 140° C. to a conversion of approximately 30 percent oxygenated molecules. The oxidate is saponified at a temperature of 125° C. using 25 percent by weight of NaOH. A mildly hydrogenative environment is maintained in the saponifier to saturate free radicals. The effluent from saponification is separated into aqueous and hydrocarbon phases, and the hydrocarbon phase recovered for return to oxidation.

The aqueous soaps are then hydrogenated under mild conditions to saturate carbonyl and olefinic linkages. Temperature 125° C., pressure 400 p.s.i., 10 percent (weight on basis of anhydrous soaps) Raney nickel catalyst, for three hours. The product of the first hydrogenation is filtered to recover the catalyst and dehydrated at 35° C. for 3 hours. Operation is under autogenous pressure with water vapor removed. A pH of 8.0 is maintained during hydrogenation.

The dehydrated soaps are then cooled to 100° C. and boiling water added with mixing to produce an aqueous soap solution which is mildly hydrogenated a second time under conditions similar to the carbonyl hydrogenation. The aqueous soaps are then acidified with $H_2SO_4$ to spring the acids which are separated and purified by distillation. The acids are saturated free of carbonyl and hydroxyl groups, and of esters, lactones and other such impurities normally present. The acids are of light straw color and free of objectionable odor.

EXAMPLE II

Example I is repeated however in the dehydration step the mass is first heated to 125° C. to drive off all free water and then 10 percent (based on anhydrous soaps) activated clay (silica-alumina mixture) dehydration catalyst is added. Following this the mass is held at 230–250° C. for three hours. The soaps are then placed in the water solution, filtered to remove the dehydration catalyst and given the second hydrogenation treatment.

EXAMPLE III

Example I is repeated with the addition of 50 percent by weight (based on anhydrous soaps) of a mixture of normal paraffin hydrocarbons averaging about 25 carbon atoms per molecule prior to dehydration. This is removed after dehydration by cooling the mass to a safe temperature, adding water, mixing and decanting. The resulting aqueous soap solution is given the second hydrogenation treatment.

EXAMPLE IV

Example II is repeated however the normal paraffins average 20 carbon atoms per molecule and are added used and recovered as in Example III. The dehydration temperature is held to 230–250° C.

EXAMPLE V

Example IV is repeated using KOH in saponification rather than NaOH.

EXAMPLE VI

Example IV is repeated however the dehydration and second hydrogenation (olefinic) are performed concurrently, the nickel catalyst remaining in the mass after the first (carbonyl) hydrogenation.

From the foregoing it is obvious that considerable modifications of the teachings of the present invention are possible without exceeding the scope thereof as defined in the appended claims.

What is claimed is:

1. In a process for producing saturated straight chain monobasic carboxylic acids free of carbonyl group and hydroxyl group impurities by processing including:

partially oxidizing normal alkane hydrocarbons having from about 14 to an average of about 20 carbon atoms per molecule to produce an oxidate having carboxylic acid groups, saponifying the oxidate with a saponification agent selected from the group consisting of sodium hydroxide and potassium hydroxide to convert the molecules having carboxylic acid groups to corresponding carboxylic acid soaps which contain carbonyl group and hydroxyl group impurities, separating the carboxylic acid soap molecules from hydrocarbon molecules, and acidifying the resulting soaps with mineral acid to produce corresponding carboxylic acids, the improvement wherein:

the carboxylic acid soaps which contain carbonyl group and hydroxyl group impurities are hydrogenated with nickel hydrogenation catalyst at a temperature from about 100° C. to about 200° C. and at a pressure from about 100 to about 500 p.s.i. to convert impurity carbonyl groups to hydroxyl groups, then the hydrogenated soaps are dehydrated by treatment at a temperature from about 200° C. to about 350° C. and a pressure from about 0.1 to about 30 atmospheres producing unsaturated soaps dehydration treatment at a temperature up to about 250° being in the presence of a dehydration catalyst, and then the unsaturated soaps are hydrogenated with nickel hydrogenation catalyst at a temperature from about 100° C. to about 200° C. and at a pressure from about 100 to about 500 p.s.i. to convert them to saturated soaps.

2. The process of claim 1 further characterized in that the dehydration is at a temperature of from about 200° C. to about 250° C. in the presence of a dehydration catalyst.

3. The process of claim 1 further characterized in that at least one of the hydrogenations is conducted at a temperature from about 125° C. to about 175° C. and at a pressure of from about 300 to about 500 p.s.i. and the dehydration is conducted in the presence of a dehydration catalyst at a temperature from about 200 to about 250° C.

4. The process of claim 1 further characterized in that at least one of the hydrogenations is conducted at a temperature from about 125° C. to about 175° C. and at a pressure of from about 300 to about 500 p.s.i. and the dehydration is conducted at a temperature from about 300 to about 350° C. in the absence of a dehydration catalyst.

References Cited

UNITED STATES PATENTS

| | | | |
|---|---|---|---|
| 2,475,605 | 7/1949 | Prytton et al. | 260—413 XR |
| 2,336,893 | 12/1943 | Scott | 260—418 |
| 2,059,232 | 11/1936 | Harder | 260—452 |

OTHER REFERENCES

Morrison et al., Organic Chemistry (1959) pp. 114–15.

NICHOLAS S. RIZZO, *Primary Examiner.*

J. A. NARCAVAGE, *Assistant Examiner.*